United States Patent [19]

Chiba

[11] 4,115,855
[45] Sep. 19, 1978

[54] BUFFER MEMORY CONTROL DEVICE HAVING PRIORITY CONTROL UNITS FOR PRIORITY PROCESSING SET BLOCKS AND UNIT BLOCKS IN A BUFFER MEMORY

[75] Inventor: Takashi Chiba, Kawasaki, Japan

[73] Assignee: Fujitsu Limited, Kawasaki, Japan

[21] Appl. No.: 715,862

[22] Filed: Aug. 19, 1976

[30] Foreign Application Priority Data

Aug. 22, 1975 [JP] Japan .............................. 50-101750

[51] Int. Cl.² .......................... G06F 7/00; G06F 13/00
[52] U.S. Cl. .................................................... 364/200
[58] Field of Search ........................ 340/172.5; 445/1; 364/200 MS File, 900 MS File

[56] References Cited

U.S. PATENT DOCUMENTS

| | | | |
|---|---|---|---|
| 3,331,055 | 7/1967 | Betz et al. ........................ | 340/172.5 |
| 3,353,160 | 11/1967 | Lindquist ........................ | 340/172.5 |
| 3,588,829 | 6/1971 | Boland et al. ................... | 340/172.5 |
| 3,611,305 | 10/1971 | Greenspan et al. ............. | 364/200 |
| 3,643,218 | 2/1972 | Cramwinckel .................. | 340/172.5 |
| 3,820,078 | 6/1974 | Curley et al. ................... | 340/172.5 |
| 3,840,862 | 10/1974 | Ready ............................. | 340/172.5 |
| 3,911,401 | 10/1975 | Lee .................................. | 340/172.5 |
| 3,958,228 | 5/1976 | Coombes et al. ............... | 340/172.5 |
| 3,964,028 | 6/1976 | Belady et al. ................... | 340/172.5 |
| 3,979,726 | 9/1976 | Lange et al. .................... | 340/172.5 |

OTHER PUBLICATIONS

R. J. Llewelyn & R. W. Taylor, "Least Recently Used Recorder", in IBM Technical Disclosure Bulletin, vol. 14, No. 8, Jan. 1972, pp. 2368–2369.

Primary Examiner—Melvin B. Chapnick
Attorney, Agent, or Firm—Staas & Halsey

[57] ABSTRACT

For extracting a unit data block of the lowest priority from a plurality of unit data blocks stored in a buffer memory of large capacity, the unit data blocks are divided into set blocks, each comprising a predetermined number of unit data blocks, and priority levels of the set blocks are determined to extract one of them. At the same time, priority levels of the predetermined number of unit data blocks making up each set block are determined to extract one of them. One unit data block is extracted by a combination of the extracted set block with the unit data blocks extracted from the respective set blocks. In this manner, one of many unit data blocks is extracted by using a small number of bits.

11 Claims, 4 Drawing Figures

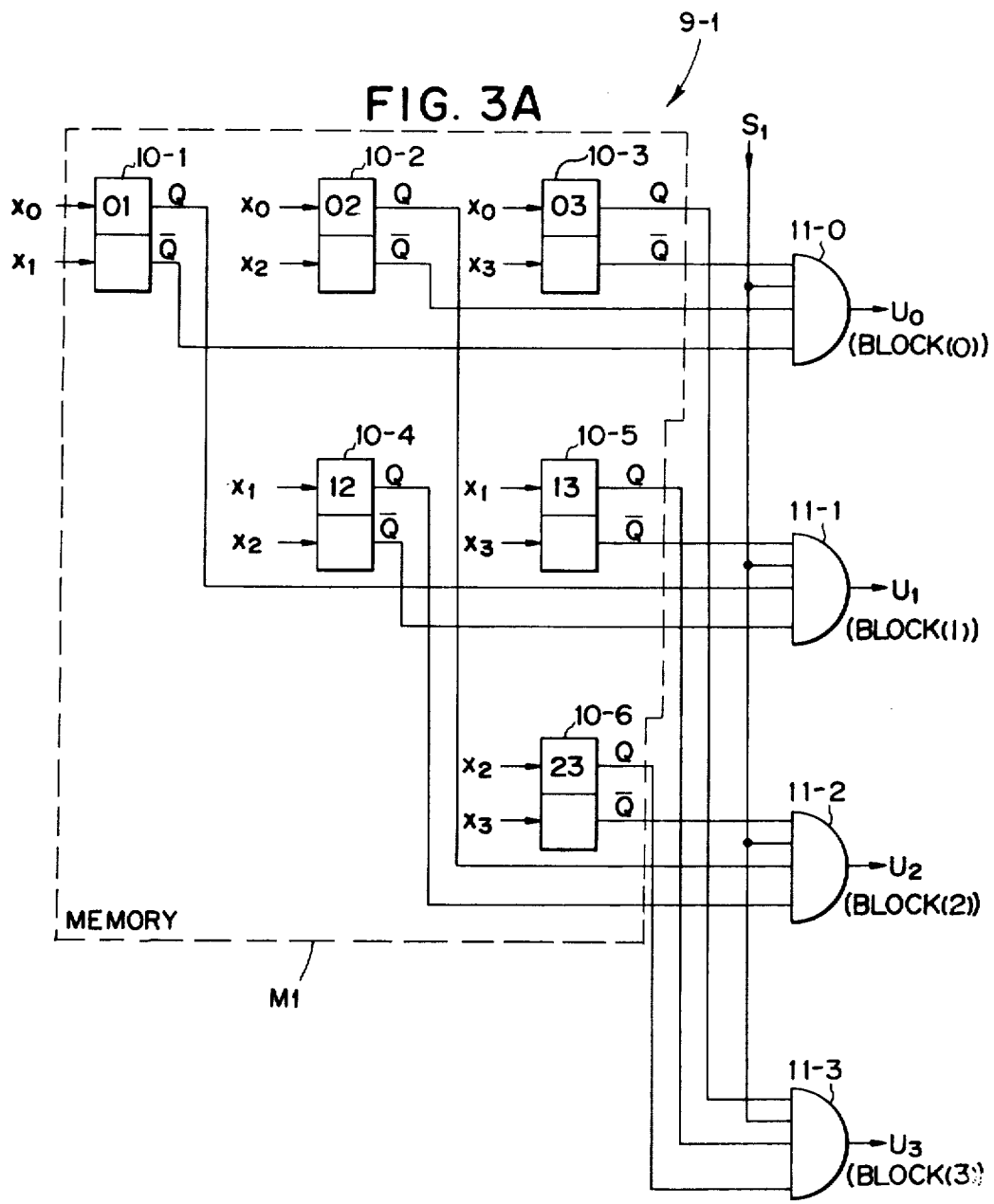

FIG. 3B

| BIT STATUS | 01 | 02 | 03 | 12 | 13 | 23 | ACCESS OR REPLACEMENT | REPLACE BLOCK |
|---|---|---|---|---|---|---|---|---|
| (1) | 0↓ | 0↓ | 0↓ | 0 | 0 | 0 | CLEAR | REP(0) |
| (2) | 1↓ | 1 | 1 | 0↓ | 0↓ | 0 | REP(0) | REP(1) |
| (3) | 0↓ | 1 | 1 | 1 | 1 | 0 | REP(1) | REP(2) |
| (4) | 1 | 1↓ | 1 | 1↓ | 1 | 0↓ | ACC(0) | REP(2) |
| (5) | 1 | 0 | 1↓ | 0 | 1↓ | 1↓ | REP(2) | REP(3) |
| (6) | 1 | 0 | 0 | 0 | 0 | 0↓ | REP(3) | REP(1) |
| (7) | 1↓ | 0 | 0 | 0↓ | 0↓ | 1 | ACC(2) | REP(1) |
| (8) | 0 | 0 | 0 | 1 | 1 | 1 | REP(1) | REP(0) |

BUFFER MEMORY CONTROL DEVICE HAVING PRIORITY CONTROL UNITS FOR PRIORITY PROCESSING SET BLOCKS AND UNIT BLOCKS IN A BUFFER MEMORY

BACKGROUND OF THE INVENTION

1. Field of the Invention

This invention relates to a buffer memory control system, and more particularly to a buffer memory control device in which, in the determination of priority of unit data blocks planted in a buffer memory, priority levels of set blocks, each including a predetermined number of unit data blocks, are determined and, at the same time, priority levels of the unit data blocks making up each set block are determined, thereby to decrease the number of bits necessary for the priority processing.

2. Description of the Prior Art

In general, a data processor having a buffer memory is designed to access a tag portion of the buffer memory to detect whether or not desired information has been planted in a data portion of the buffer memory. A data processor having a main memory and a buffer memory is disclosed, for example, in U.S. Pat. No. 3,588,829. Since only a limited number of unit data blocks are planted in the data portion of the buffer memory, a priority circuit is provided and, for example, in the case of the set associative system, priority levels of unit data blocks of a predetermined number of sets planted for each column are determined whereby to efficiently plant the unit data blocks in the data portion. Let it be assumed, for example, that the highest priority is given to the latest accessed one of the unit data blocks of the predetermined number of sets and that the lowest priority is given to the earliest accessed unit data block. (This is called the LRU algorithm.) In the case where it is necessary to transfer a new unit data block to the buffer memory from another memory (main memory), the unit data block given the lowest priority is assigned as a block to be replaced with the new unit data block and is driven out from the buffer memory, and then the new unit data block is transferred to the buffer memory.

In such priority processing according to the prior art, for example, if the set number of the buffer memory is 2, that is, if the number of unit data blocks which can be planted on the buffer memory is 2, one bit is required for determining two priority relationships. That is, either one of the two set has priority over the other depending upon whether the bit is "1" or "0". Similarly, in the case of the number of sets planted on the buffer memory being 4, the number of bits required is 6 in all which are respectively indicative of the priority relationships between first and second sets, between first and third sets, between first and fourth sets, between the second and third sets, between the second and fourth sets and between the third and fourth sets. In the cases of the number of sets being 8, 16 and 32, the required number of bits is 28, 120 and 496, respectively. In other words, if the number of sets is taken as $x$, the required number of bits is given by $x(x-1)/2$. Since the number of pairs of sets selected from the set number $x$ is $x(x-1)/2$ and since either one of the two sets of each pair is given priority over the other depending upon whether one bit is "1" or "0", the above relationship equation is obtained.

However, it is generally believed that the number of bits usable within practice is 28 at the largest, and priority processing for a relatively large capacity buffer memory having more than 16 sets requires a very large amount of hardware and is regarded as difficult from the technical point of view, too.

SUMMARY OF THE INVENTION

One object of this invention is to provide a buffer memory control device which permits priority processing of a buffer memory by a small number of bits, even if the buffer memory has a large capacity.

Another object of this invention is to provide a buffer memory control device which enables priority processing of a buffer memory without reducing its processing speed.

Briefly stated, in priority processing of, for example, 16 sets, that is, 16 unit data blocks, a general idea of set blocks, each including four unit data blocks, is introduced. The priority levels of four set blocks in all are determined and, at the same time, the priority levels of the four unit data blocks making up each set block are determined, to thereby assign the unit data block to be replaced, whereby the number of bits required for the priority processing is decreased from 120 to 30 ($=6+6\times 4$). To perform this, according to the present invention, in the buffer memory control device which has a data portion for planting a plurality of unit data blocks and a tag portion for holding address information of each of the unit data blocks planted in the data portion, the unit data blocks planted in the data portion are divided into set blocks, each formed with a predetermined number of unit data blocks, and the address information of each set block is planted in the tag portion. A first priority circuit is provided for giving priority to the set blocks one over another and, further, second priority circuits are provided for determining the priority levels of the unit data blocks forming the respective set blocks. In the priority processing, the priority levels of the unit data blocks are determined by a set block assigning signal from the first priority circuit and unit data block assigning signals from the second priority circuits, whereby one of the unit data blocks is extracted.

BRIEF DESCRIPTION OF THE DRAWINGS

FIGS. 3A and 3B respectively show the circuit construction of one embodiment of a priority processing circuit provided according to this invention and a diagram explanatory of its operation.

DESCRIPTION OF THE PREFERRED EMBODIMENTS

Figure 1:
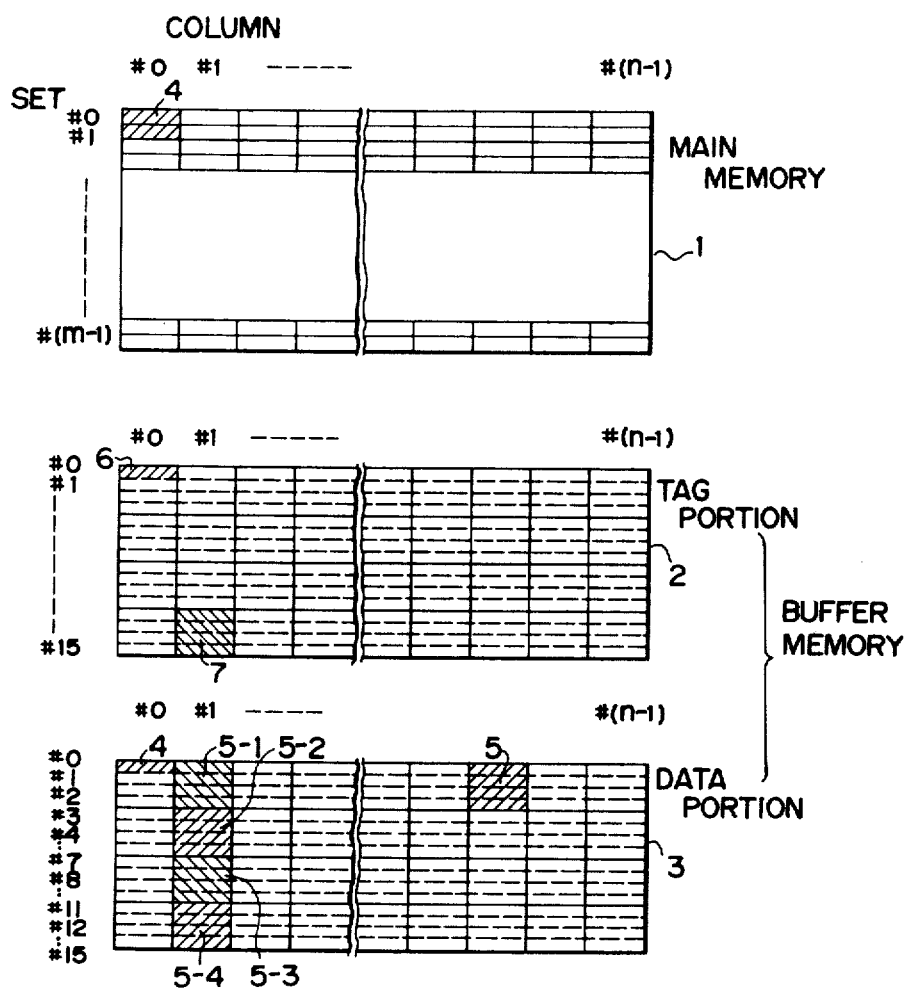
FIG. 1 is an explanatory diagram of a set associative method, for explaining a buffer memory control device of this invention.

In FIG. 1, reference numeral 1 indicates a main memory; 2 indicates a tag portion of a buffer memory for maintaining address information of each unit data block planted in a data portion 3 of the buffer memory; 3 identifies the abovesaid data portion in which a predetermined number of data blocks planted on the main memory 1 can be planted for each column; 4 represents unit data blocks; 5 denotes set blocks, each composed of a combination of a predetermined number of unit data blocks 4; 6 shows unit address blocks, each having planted therein address information for each unit data block 4; and 7 refers to set blocks, each composed of unit addresses corresponding to each of the set blocks 5.

The main memory 1 comprises #0 to #(m−1) (sets) and #0 to #(n−1) (columns), and has planted therein m (sets) × n (columns) unit data blocks.

The tag portion 2 and the data portion 3 of the buffer memory have respectively planted therein the unit address blocks 6 and the unit data blocks 4 corresponding to 16 sets #0 to #15 of the m sets of the main memory 1 for each column. In the planting of the data of the main memory 1 on the buffer memory, the data is planted in those areas of the buffer memory which have the same column numbers as those in the main memory 1.

Let it be assumed that a processing unit having the buffer memory requires a data of a desired address Aij and that the address Aij belongs to a jth column of an ith set in the main memory. In this case, the jth columns of the tag portion and the data portion are both accessed at the same time and 16 addresses read out of the tag portion are each compared with the i of the address Aij. When coincidence is detected between them, there is outputted the data which is set in the data portion at the position corresponding to that in the tag portion where the address is set. When no coincidence is detected, a required unit data block is transferred from the main memory.

In general, the buffer memory performs the above operation. In the case of transferring a new unit data block to the buffer memory, if all the areas of the buffer memory which correspond to the column number of the new unit data block are already occupied by previous unit data blocks, it is necessary to drive out any one of the unit data blocks. To determine which one of the unit data blocks is to be driven out, priority of the unit data blocks is determined based on the LRU algorithm and, for this determination, priority levels are given to the unit data blocks. For efficient determination of the priority levels, in the present invention, for example, the buffer memory has four set blocks 5-1 to 5-4 for each column and each set block has four unit data blocks.

Figure 2:
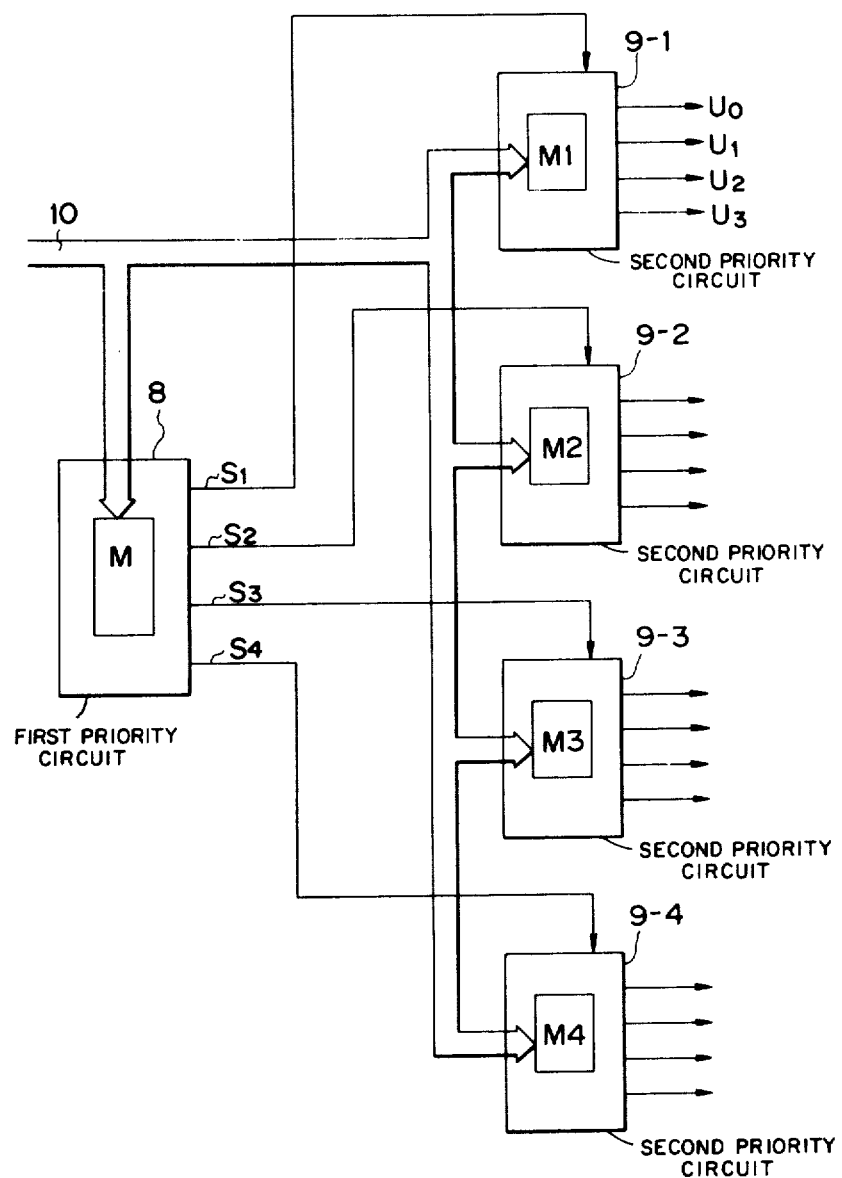
FIG. 2 is a block diagram of the buffer memory control device of this invention.

FIG. 2 illustrates the construction of one embodiment of this invention which is adapted to achieve priority processing of the columns of such a buffer memory as shown in FIG. 1 which has the data portion 3 and the tag portion 2.

In FIG. 2, reference numeral 8 indicates a first priority circuit which determines the priority levels of the four set blocks 5-1 to 5-4 in each column and supplies second priority circuits 9-1 to 9-4 with set block assigning signals $S_1$ to $S_4$ assigning a set block of the lowest priority. Reference numerals 9-1 to 9-4 designate the abovesaid second priority circuits, each of which determines the priority levels of the four unit data blocks 4 making up each of the abovesaid set blocks 5-1 to 5-4. The second priority circuits 9-1 to 9-4 respectively perform priority processing for the four unit data blocks in #0 to #3 set positions forming the set block 5-1, in #4 to #7 set positions forming the set block 5-2, in #8 to #11 set positions forming the set block 5-3 and in #12 to #15 set positions forming the set block 5-4. Further, each of the priority circuits 9-1 to 9-4 outputs unit data block designating signals $U_0$ to $U_3$ for designating the lowest-priority one of the four unit data blocks making up each set block. Reference numeral 10 identifies a bus for replacement of the unit data block 4 or transmission of access information. Reference characters M and $M_1$ to $M_4$ represent memories. Assuming that the set block 5-1 has lower priority than the other set blocks 5-2 to 5-4 and that the unit data block at the #2 set position has lower priority than the others in the set block 5-1, the first priority circuit 8 outputs only the set block designating signal $S_1$ and the second priority circuit 9-1, supplied with the above set block designating signal $S_1$, outputs the unit data block designating signal $U_2$ alone. For example, in the case where the buffer memory is accessed in the above condition and a unit data block having desired information has not been planted in the data portion 3 (FIG. 1), the unit data block at the #2 set position is driven out based on the abovesaid unit data block designating signal $U_2$ derived from the second priority circuit 9-1 and a data in the main memory (FIG. 1) is newly transferred to the #2 set position.

FIG. 3A illustrates the construction of one example of the circuit corresponding to each of the first priority circuit 8 and the second priority circuits 9-1 to 9-4. FIG. 3B shows an example of its operation. The following description will be given on the assumption that the circuit construction of FIG. 3A corresponds to the second priority circuit 9-1.

In FIG. 3A, reference numerals 10-1 to 10-6 indicate flip-flops, which form the memory $M_1$. Reference character $S_1$ denotes a set block designating signal. Reference numerals 11-0 to 11-3 designate AND gates. Reference characters $U_0$ to $U_3$ represent unit data block designating signals, which are derived from the AND gates 11-0 to 11-3. The AND gate 11-0 designates, as a replacement block, the unit data block at #0 set position (hereinafter referred to as the block (0)) which is one of the four unit data blocks 4 making up the set block 5-1 shown in FIG. 1. The AND gate 11-1 designates, as a replacement block, the unit data block at #1 set position (hereinafter referred to as the block (1)) which is one of the abovesaid four unit data blocks. The AND gate 11-2 similarly designates, as a replacement block, the unit data block at #2 set position (hereinafter referred to as the block (2)). Likewise, the AND gate 11-3 designates, as a replacement block, the unit data block at #3 set position (hereinafter referred to as the block (3)). As the number of input signals of logic "1" to the AND gates 11-0 to 11-3 increases, priority of the unit data blocks designated by the outputs of the AND gates becomes lower. Reference characters $x0$ to $x3$ indicate input signals to the flip-flops 10-1 to 10-6. The signal $x0$ becomes "1" when the block (0) is accessed or replaced. Similarly, the signals $x1$, $x2$ and $x3$ respectively become "1" when the blocks (1), (2) and (3) are accessed or replaced.

Assuming that the flip-flops 10-1 to 10-6 are being supplied with clear signals respectively to provide Q outputs of logic "0", when the set block designating signal $S_1$ is applied, only the AND gate 11-0 produces an output of logic "1" to designate the block (0) as the replacement block. Now, if the flip-flops 10-1 to 10-6 are assumed to be represented with bits "01", "02", "03", "12", "13" and "23", respectively, the status that the abovesaid clear signals are being applied to the flip-flops, can be expressed by (1) in FIG. 3B. In FIG. 3B REP(k) and ACC(k) ($k=0, 1, 2, 3$) *indicate replacement blocks and accessed blocks, respectively. Broken line arrows represent changes.*

Next, in the abovesaid status (1), when the block (0) is replaced, the signal $x0$ becomes "1", so that the flip-flops 10-1 to 10-3 respectively provide Q outputs of logic "1". Namely, the status (1) is changed to the status (2) shown in FIG. 3B. Since this status (2) is only to change the output signal of the AND gate 11-1 alone to have logic "1", the block (1) is designated as a block of the lowest priority, i.e. a replacement block, as indicated by REP(1).

In the status (2), when the block (1) is replaced, the signal $x1$ becomes "1" to reset the flip-flop 10-1 to derive therefrom a Q output of logic "0". Further, the flip-flops 10-4 and 10-5 are respectively set to produce Q outputs of logic "1". That is, the status (2) is altered to the status (3) shown in FIG. 3B. Since the status (3) is only to derive an output signal of logic "1" from the AND gate 11-2 alone, the block (2) is designated as a replacement block.

In the status (3), when the block (0) is accessed, the signal $x0$ becomes "1" to set the flip-flop 10-1 to derive therefrom a Q output of logic "1". The other flip-flops 10-2 to 10-6 are retained in the same output states as those in the abovesaid status (2). Consequently, the status (3) is shifted to the status (4) shown in FIG. 3B. In the status (4), the states of the flip-flops are changed by an access to the block (0) as indicated by ACC(0) but the output signal of the AND gate 11-2 alone is made to have logic "1" as is the case with the abovementioned status (3), so that the block (2) is still designated as a replacement block, as indicated by REP(2).

Similarly, in the status (4), when the block (2) is replaced, the signal $x2$ becomes "1" to reset the flip-flops 10-2 and 10-4 to derive therefrom Q outputs of logic "0" and, at the same time, the flip-flop 10-6 is set to produce a Q output of logic "1". That is, the status (4) is altered to the status (5) shown in FIG. 3B. In the status (5), the block (3) is designated as a replacement block. Upon replacement of the block (3), the flip-flops 10-3, 10-5 and 10-6 are respectively reset to bring about the status (6) shown in FIG. 3B. In the status (6), when the block (2) is accessed, the flip-flop 10-6 is set, with the result that the status (7) shown in FIG. 3B is brought about. In the status (7), the block (1) is designated as a replacement block. Then, when the block (1) is replaced, the flip-flop 10-1 is reset and the flip-flops 10-4 and 10-5 are set to provide the status (8) shown in FIG. 3B. In the status (8), the block (0) is designated as a replacement block.

In this manner, the priority circuit 9-1 performs the priority processing of the four unit data blocks (0), (1), (2) and (3). The other second priority circuits 9-2, 9-3 and 9-4 are each also identical in construction with the abovesaid priority circuit 9-1 and perform the same priority processing of the four unit data blocks and the four set blocks as described above. Namely, in this invention, the priority levels of the set blocks are determined by the first priority circuit 8 to assign the set block of the lowest priority and, the priority levels of the unit data blocks making up each set block are determined by each of the second priority circuits 9-1 to 9-4 to assign the unit data block of the lowest priority. Accordingly, the replacement block is determined by a combination of the priority processing of the first priority circuit 8 with that of the second priority circuits 9-1 to 9-4. In other words, of the plurality of unit data blocks forming the lowest-priority set block assigned by the first priority circuit 8, the lowest-priority unit data block, which is designated by the second priority circuit corresponding to the abovesaid set block, is selected as the replacement block. In this case, since priority is already determined at the instant of accessing to the buffer memory, a time lag due to the priority circuit does not matter.

In accordance with this invention, the priority levels of the set blocks are determined by the first priority circuit 8 and the priority levels of the unit data blocks making each set block are determined by each of the second priority circuits 9-1 to 9-4, as described in the foregoing. This enables remarked reduction of the number of bits required for the priority processing in the buffer memories desired to have a relatively large capacity, and, further, such priority processing does not take much time, so that the buffer memory can be controlled at high speed.

It will be apparent that this invention is not limited specifically to the foregoing example and that many modifications and variations may be effected without departing from the scope of this invention.

What is claimed is:

1. A buffer memory control device having priority control units for priority processing set blocks and unit blocks in a buffer memory, each set block comprising a predetermined number of unit data blocks, said buffer memory control device comprising:
   means for identifying each of said set blocks in accordance with determining their priority levels so as to designate a least recently used set block;
   means for identifying each one of the unit data blocks of each of said set blocks in accordance with determining priority levels of said unit data blocks within each of said set blocks based on which of said unit data blocks within said each of said set blocks was least recently used, said priority levels of said unit data blocks being determined simultaneously with the identifying of said set blocks; and
   means for extracting one unit data block by a combination of identifying the least recently used set block and the least recently used unit data block from each set block.

2. A buffer memory control device for use in a priority processing system for establishing relative priorities among unit data blocks stored in a buffer memory, said unit data blocks being grouped into set blocks, each set block comprising a plurality of unit data blocks, said buffer memory control device comprising, in combination:
   first priority circuit means for priority processing said set blocks so as to determine relative priorities among said set blocks, and having a corresponding output for each of said set blocks for transmitting a first signal on said output corresponding to said set block having lowest priority, said first signal comprising a set block assigning signal; and
   second priority circuit means, one for each respective set block, for priority processing said unit data blocks in said respective set block so as to determine relative priorities among unit data blocks in said respective set block simultaneously with said priority processing of said set blocks by said first priority circuit means, each second priority circuit means being connected to said output of said first priority circuit means corresponding to said respective set block for receiving said set block assigning signal, and having a corresponding output for each unit data block in said respective set block;
   said second priority circuit means for said set block having lowest priority being responsive to said set block assigning signal for transmitting a second signal on said output corresponding to said unit data block having lowest priority, said second signal comprising a unit data block designating signal.

3. A buffer memory control device as recited in claim 2, wherein each second priority circuit means includes an internal memory having memory outputs, one for each respective unit data block in said respective set block, each memory output having a logical condition designating a priority level of said respective unit data block relative to the other unit data blocks in said respective set block, said internal memory having an input for receiving a signal indicating that a given unit data block has been selected for replacement, and responsive thereto for selectively adjusting said logical conditions after replacement, whereby to reorder the priority level of said given unit data block to a highest priority while maintaining the relative priorities of said unit data blocks other than said given unit data block.

4. a buffer memory control device as recited in claim 3, wherein said internal memory comprises a plurality of flip-flop devices having set and reset outputs, selected ones of said set and reset outputs comprising said memory outputs for each respective unit data block.

5. A buffer memory control device as recited in claim 3, wherein each second priority circuit means includes a plurality of logic gates, one logic gate for each respective unit data block in said respective set block, each logic gate being connected to a respective one of said memory outputs for detecting a respective one of said logical conditions, each said logic gate having an output comprising said corresponding output for each unit data block in said respective set block and being responsive to said set block assigning signal and to said respective one of said logical conditions for providing said unit data block designating signal when said respective unit data block has a priority level which is the lowest priority level.

6. A buffer memory control device as recited in claim 5, which said internal memory comprises a plurality of flip-flop devices having set and reset outputs, selected ones of said set and reset outputs comprising said memory outputs for each respective unit data block.

7. A buffer memory control device as recited in claim 5, wherein said internal memory has an additional input connected to the output of said logic gates for receiving said unit data block designating signal, said internal memory being further responsive to said signal indicating that a given unit data block has been selected and to said unit data block designating signal to render the priority of said given unit data block to the highest priority.

8. A buffer memory control device as recited in claim 2, wherein each second priority circuit means includes an internal memory having memory outputs, one for each respective unit data block in said respective set block, each memory output having a logical condition designating a priority level of said respective unit data block relative to the other unit data blocks in said respective set block, said internal memory having an input for receiving a signal indicating that a given unit data block has been selected for access, and responsive thereto for selectively adjusting said logical conditions after access whereby to re-order the priority level of said given unit data block to a lowest priority while maintaining the relative priorities of said unit data blocks other than said given unit data block.

9. A buffer memory control device as recited in claim 8, wherein said internal memory comprises a plurality of flip-flop devices having set and reset outputs, selected ones of said set and reset outputs comprising said memory outputs for each respective unit data block.

10. A buffer memory control device as recited in claim 8, wherein each second priority circuit means includes a plurality of logic gates, one logic gate for each respective unit data block in said respective set block, each logic gate being connected to a respective one of said memory outputs for detecting a respective one of said logical conditions, each said logic gate having an output comprising said corresponding output for each unit data block in said respective set block and being responsive to said set block assigning signal and to said respective one of said logical conditions for providing said unit data block designating signal when said respective unit data block has a priority level which is the lowest priority level.

11. A buffer memory control device as recited in claim 10, which said internal memory comprises a plurality of flip-flop devices having set and reset outputs, selected ones of said set and reset outputs comprising said memory outputs for each respective unit data block.

* * * * *

UNITED STATES PATENT AND TRADEMARK OFFICE
CERTIFICATE OF CORRECTION

PATENT NO. : 4,115,855
DATED : September 19, 1978
INVENTOR(S) : Takashi Chiba

It is certified that error appears in the above-identified patent and that said Letters Patent are hereby corrected as shown below:

Column 1, line 48, "set" should be --sets--.
Column 4, lines 59-61, the words "indicate replacement. . . represent changes" should not be italicized.
Column 7, line 14, "a" should be --A--.

Signed and Sealed this

Twenty-eighth Day of November 1978

[SEAL]

Attest:

RUTH C. MASON
*Attesting Officer*

DONALD W. BANNER
*Commissioner of Patents and Trademarks*